July 20, 1954

C. D. McCLURE ET AL 2,684,468

APPARATUS FOR MEASURING A PERIODICALLY RECURRING
SIGNAL IN THE PRESENCE OF RANDOM NOISE

Filed Aug. 21, 1950

CARROL D. McCLURE
ROBERT L. MILLS
INVENTOR.

BY D. Carl Richards

AGENT

July 20, 1954 C. D. McCLURE ET AL 2,684,468
APPARATUS FOR MEASURING A PERIODICALLY RECURRING
SIGNAL IN THE PRESENCE OF RANDOM NOISE
Filed Aug. 21, 1950 3 Sheets-Sheet 3

CARROL D. McCLURE
ROBERT L. MILLS
INVENTOR.

BY D. Carl Richards
AGENT

Patented July 20, 1954

2,684,468

UNITED STATES PATENT OFFICE 2,684,468

APPARATUS FOR MEASURING A PERIODICALLY RECURRING SIGNAL IN THE PRESENCE OF RANDOM NOISE

Carroll D. McClure and Robert L. Mills, Dallas, Tex., assignors, by mesne assignments, to Socony-Vacuum Oil Company, Incorporated, New York, N. Y., a corporation of New York Application August 21, 1950, Serial No. 180,674

14 Claims. (Cl. 333—70)

This invention relates to the measurement of the periodic signal component of an electrical voltage which includes random noise energy of varying polarity and of amplitude which may be high with respect to the periodic signal component to be measured.

In a more specific aspect, the invention relates to geophysical exploration wherein relatively low amplitude signals reflected from sub-surface beds or resistive interfaces are to be measured in the presence of noise signals that are of relatively high amplitude.

In electrical exploration for detection of subsurface reflecting horizons as an indication of structure related to petroleum or mineral deposits, constant frequency current pulses may be applied to the earth's surface and potentials resulting therefrom may be measured at selected locations with respect to the point of application of the current. Sources of random noise energy that ordinarily make the measurement of low amplitude reflections impossible, or at best, very difficult, include stray 60 cycle energy from power lines, varying telluric currents and others, most or all of which ordinarily are beyond control of a geophysical exploring party. Various measures have been taken to eliminate, buck out, or otherwise compensate for the random noise encountered. However, in many instances, such measures have been found to be inadequate since the noise energy is, in general, in the same frequency range and often is many times the amplitude of the signal to be detected.

In accordance with the present invention, a composite electrical voltage consisting of random noise of varying polarity and amplitude combined with a periodic signal component is detected and the periodic signal component is measured by continuously converting the composite signal to stored energy in form corresponding with that of the signal. The stored energy is detected and repeatedly combined later in time with said composite signals in a phase relation or at a repetition rate that is determined by the frequency of the periodic signal component. For each combining operation, the periodic signal component of the detected energy is added in phase-coincidence with the periodic signal component of said composite signal appearing later in time. However, the sum of the combined signals is then stored as energy, and the foregoing is repeated whereby the ratio of the periodic signal component of said composite signal to said noise is repeatedly and incrementally increased.

For a more complete understanding of the present invention, reference may now be had to the following description taken in conjunction with the accompanying drawings in which.

For the purpose of the present description, an electrical prospecting system including a magnetic storing unit will first be described in some detail and thereafter a more complete and somewhat more general analysis of certain features of construction and operation together with other modifications will be described.

Figure 1:
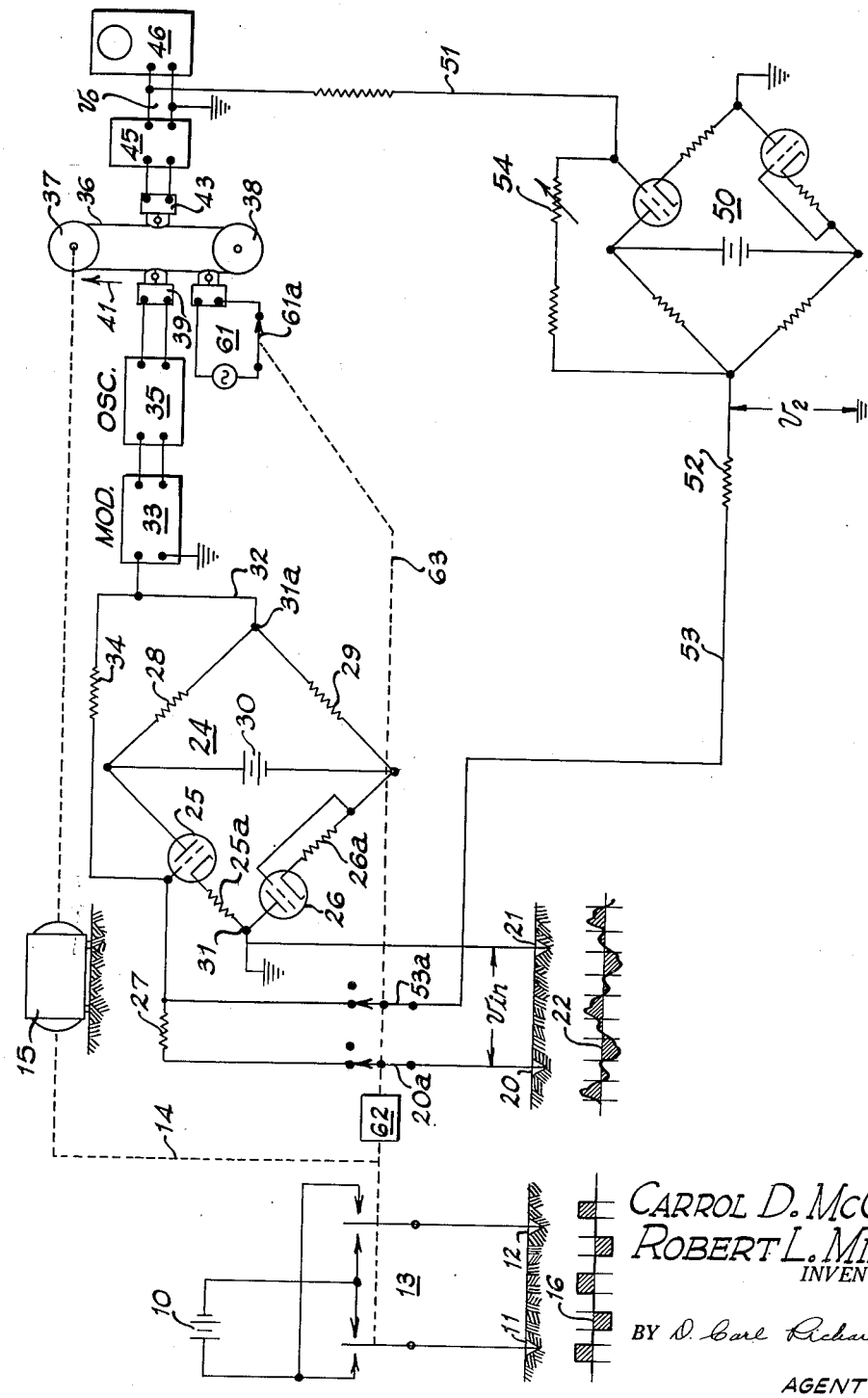
Fig. 1 is a schematic diagram of an exploring system embodying the invention.

In the system illustrated in Fig. 1, current from a source generically represented by a battery 10 flows through the earth between electrodes 11 and 12. The character of the current flowing through the earth may be controlled by a commutating device represented by the double-pole double-throw switch 13. The arms of the switch 13 are mechanically coupled and actuated through means indicated by the dotted line 14 leading to a driving motor 15. The arms of the switch 13 are repeatedly driven through coupling 14 from a first closed circuit position to a second closed circuit position at a selected constant rate to produce spaced square wave current pulses alternately of opposite polarity in the earth between electrodes 11 and 12. Two and a half cycles of such pulses are illustrated and noted by the reference character 16. The length of the pulses 16 as compared with the period or the space therebetween depends, of course, upon the length of dwell of the arms of switch 13 in the closed circuit positions. For the purpose of the present description, it will be assumed that the current pulses and the spaces between pulses are equal in duration. The repetition rate or the frequency of the input signal may be selected in accordance with the teachings of the prior art from between ½ to 30 cycles per second.

It is well known that the flow of such square wave current pulses in a given portion of the earth produces potentials which may be related to earth structure and, in electrical prospecting, the measurement of such potentials yields valuable information as to the character of the earth structure.

If the current electrodes 11 and 12 and detecting electrodes 20 and 21 are oriented so that each electrode is at one corner of a rectangle, it has been found that a potential pattern 22 (shown free of noise energy) will be detected between electrodes 20 and 21 as a result of the input pulses 16. It will be recognized that the potential pattern or wave 22 also comprises two and one-half cycles corresponding with the current pulses 16. As has been more fully disclosed in co-pending application, Serial No. 112,741, to Charles I. Beard, a co-employee of applicant, it has been found desirable to reproduce at least one complete half cycle of the wave form 22 undistorted by noise impulses. In accordance with the present invention, one, two or several cycles may be reproduced in their true character by increasing their amplitude without corresponding increase in random noise components. The noise components have not been shown in Fig. 1, but they may be many times the amplitude of the wave form 22 as detected by electrodes 20 and 21 and are random in their occurrence.

In one form of the present invention, the detected signal represented by the wave form 22 plus the obscuring high-amplitude noise components appearing as the voltage ($v_{in}$) is applied to the grid circuit of a mixer or bridge amplifier 24 comprising tubes 25 and 26. More particularly, electrode 20 is connected by way of resistor 27 to the grid of tube 25. The tube 25 with its cathode-resistor 25a forms one arm of the bridge circuit. The tube 26 with its cathode-resistor 26a forms an adjacent arm thereof. The resistors 28 and 29 complete the bridge circuit. Battery 30 is connected across one diagonal of the bridge. The electrode 21 is connected to one side of the other diagonal of the bridge, the point 31, which is the electrical ground of the amplifier 24. The output of the bridge is taken across the diagonal defined by ground point 31 and the common juncture 31a between the resistors 28 and 29. A conductor 32 leads from the output point 31a to the input of a modulator 33 forming a part of a magnetic recording system. Resistor 34 connected between the output point 31a and the grid of tube 25 forms a feedback path for degenerative action in the bridge amplifier. The size of feedback resistor 34 controls the gain of the bridge amplifier and the manner of its selection will later be explained in detail.

The signal output from the bridge amplifier applied to the modulator 33 is impressed upon an oscillator 35 to frequency modulate the output thereof which is then stored as magnetic energy.

In the form illustrated in Fig. 1, a continuous loop of magnetizable material 36, such as is used in magnetic recording devices, is driven over pulleys 37 and 38 by the motor 15. The speed or velocity of the tape 36 preferably is maintained constant and directly proportional to the rate at which the arms of the commutating switch 13 are actuated. The output of the oscillator 35 is impressed on a recording head 39 adjacent the magnetic tape 36. Thus, a signal detected between electrodes 20 and 21 passes through the bridge amplifier 24 to the modulator 33 to frequency modulate the oscillator 35 whose output then has a frequency variation corresponding with the wave shape of the input signal ($v_{in}$). This output is then recorded on the magnetic tape 36. With the tape 36 traveling in the direction of the arrow 41, the signal recorded thereon is detected by a transducer 43 positioned later in the travel path of loop 36. As illustrated, the recording head 39 and the transducer 43 are positioned at diametrically opposed points on the loop 36. The loop 36, in this form of the invention, preferably has such a relation between length and speed that two complete cycles of the signal wave 22 will be recorded thereon. In other words, the loop is two wave lengths long with respect to the signal 22, a given point on the loop 36 traversing the entire path thereof during the time interval of two complete cycles of the repetitive signal 22. A discriminator 45 coupled to the transducer 43 demodulates the detected signal and applies the output ($v_o$) to an oscilloscope 46 where the signal may be viewed, measured, photographed or otherwise studied.

Detailed descriptions of the modulator 33, oscillator 35, transducers 39 and 43, the discriminator 45, and certain details concerning construction of the loop 36 and its driving mechanism have been omitted since they are generally well known and understood by those skilled in the art. Further, recorders using magnetic tapes suitable for use as set fort herein and including the above components are available commercially. One such device is manufactured by the Brush Development Company of Cleveland, Ohio, and marketed as "Transient Recorder BL-502."

It will be remembered that without further treatment or modification, the signal ($v_o$) thus appearing on the oscilloscope in general includes noise energy which masks and makes completely unidentifiable the component thereof corresponding with the wave form 22. To eliminate the effects or the presence of the noise on the oscilloscope 46, there is provided in accordance with the present invention a feedback system including a second amplifying bridge network 50. The network 50 is connected by way of conductor 51 and ground to the output of the discriminator 45. The output ($v_2$) of bridge 50 is in turn coupled through resistor 52 and conductor 53 directly to the input grid of the tube 25 of the input amplifying bridge circuit 24. The bridge circuit 50 is identical in construction and operation with that of the input bridge circuit except that a variable feedback resistor 54 is provided to control the amplitude of the feedback voltage ($v_2$) applied by way of conductor 53. The voltage ($v_2$) fed back into the first bridge network is so related in time with subsequent cycles of the periodic signal component 22 of the input signal ($v_{in}$) that the periodic signal components of ($v_{in}$) and ($v_2$) are added "in phase" at the grid of tube 25. That is, if resistors 27 and 52 are equal, the voltage effective on the grid of tube 25 will be proportional to ($v_{in}+v_2$). It will be apparent that other mixing circuits could be employed at the input to tube 25 to affect the desired combining of the input signals thereto. In any case, for each cycle the periodic signal component of the signal impressed on the tape 36 is increased inasmuch as there are added together a direct input signal and a stored signal.

Since noise components, by definition, are either of random nature or are irrational in frequency as compared to the frequency of the periodic signal component 22, the noise components will not be increased or reinforced. On the contrary, the noise components may be cancelled out. In any event, there is attained a disproportionately large increase in the signal-to-noise ratio.

In order to effect the proper phasing between the feedback signal ($v_2$) and the input signal ($v_{in}$), it is necessary that the velocity of the tape 36 and the spacing between the recording head 39 and the transducer 43 be so adjusted that the time-distance between the recording and detecting heads associated with the tape 36 is equal to an even integral number of wave lengths of the periodic signal component 22 of the composite signal stored on the tape. As briefly mentioned above, the loop 36 preferably is two wave lengths long in terms of the signal component 22.

If the total gain of the system comprising the modulator 33, the oscillator 35, the transducers 39 and 43 and the discriminator 45 is unity, and the bridge amplifier 50 in the feedback network has unity gain, then the increase in the periodic signal component of the voltage stored on the tape 36 will be directly proportional to the number of storing operations. This will be readily understood by assuming an initial condition where no signal has been stored on the tape 36. Thereafter, the first cycle of signal 22 will be recorded on the tape 36. Its amplitude, for purposes of the present discussion, will be assumed to be equal to unity. If, now, the distance between the recording head 39 and the transducer 43 is one wave length long for the frequency of wave 22, the first cycle of that signal which was recorded will be detected, fed back, and added at the input grid of tube 25 in phase, as respects that frequency, to the second cycle thereof. Their amplitude will thereby be doubled. For each subsequent cycle, the relative amplitude of the sum will be further increased.

More particularly, the signal of double amplitude as reproduced by the transducer 43 will apply a positive feedback signal of double amplitude by way of the bridge 50 to the grid of tube 25. Thus, the signal of double amplitude will be added at the aforementioned grid to the succeeding signal from electrodes 20 and 21 and the sum will then be recorded on the loop 36. Meanwhile, by means of an erasing or obliterating system generically represented by the circuit 61, the stored signal will be removed after detection by the transducer 43 to clear the loop 36 for the storage of the next signal. Thus, as the double signal added to the succeeding signal arrives at the transducer 39, the signal of trebled amplitude will be recorded and later applied by transducer 43 and discriminator 45 to the amplifying bridge 50 for addition at the grid of tube 25 to the next succeeding signal.

In the foregoing manner, the amplitude of the signal of regular and predetermined frequency may be increased as desired depending, within the range of amplification of the electronic components, only on the number of cycles of the signal 22 to be added to the successively stored signals.

During the foregoing cumulative increase in the amplitude of the periodically recurring signal, random noise present, which frequently upon initial application of the signal to be detected may greatly exceed the amplitude thereof, will not be increased in the above manner for the reason that noise energy in general does not have the characteristic of uniform frequency but is of variable frequency and amplitude and, hence, in the cumulative operations above described there will be both subtraction and addition of noise energy, whereas there will always be in-phase addition of desired signals. It has been determined in practice that by the cumulative process referred to, the signal-to-noise ratio may be greatly increased and there may be obtained from the signals applied to the earth's surface potential waves sufficiently unaffected by noise energy to be of great value in determining characteristics of formations in the earth.

The wave form is visible at all times on the oscilloscope 46. At any desired time in the operation of the system, detailed study of the wave form is made possible by opening the input circuit by means of switch 20a and the feedback circuit by means of switch 53a to prevent application of further signals to the amplifying network 24. At the same time, a switch 61a in the obliterating circuit 61 may be opened for retention on the recording loop 36 of the signal which it is desired to study on the oscilloscope 46. In order that the number of additive operations may at all times be known, a counter 62 may be provided driven from the motor 15 to indicate the number of cycles of operation of the contact of switch 13. Counter 62 in manner well understood by those skilled in the art is also used to open switches 20a, 53a and 61a after a predetermined number of cycles of operations of switch 13 which will predetermine the number of additive operations carried out by the system. Thereafter, the signal will be continuously displayed by the oscilloscope 46 for visual study, or it may be applied to recording equipment for permanent record.

Thus, in accordance with the above outlined procedures, electrodes 11, 12, 20 and 21 may be positioned at selected points in a given area, current applied to the earth through electrodes 11 and 12 for a sufficient number of cycles to increase the signal-to-noise ratio by the storing, detecting and combining operations to build up a signal on the magnetic storing medium that is free of noise.

Figure 2:
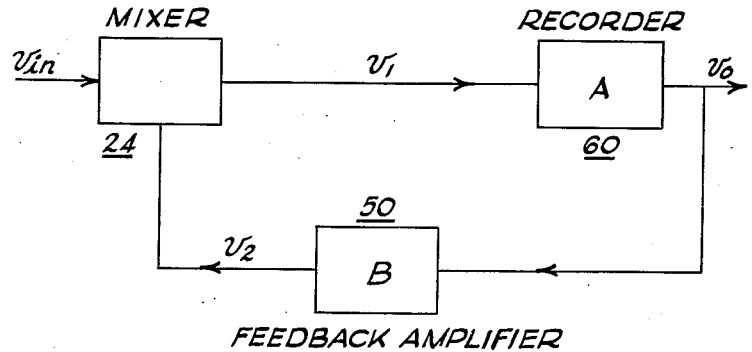
Fig. 2 is a block diagram representative of a portion of Fig. 1.
Figure 3:
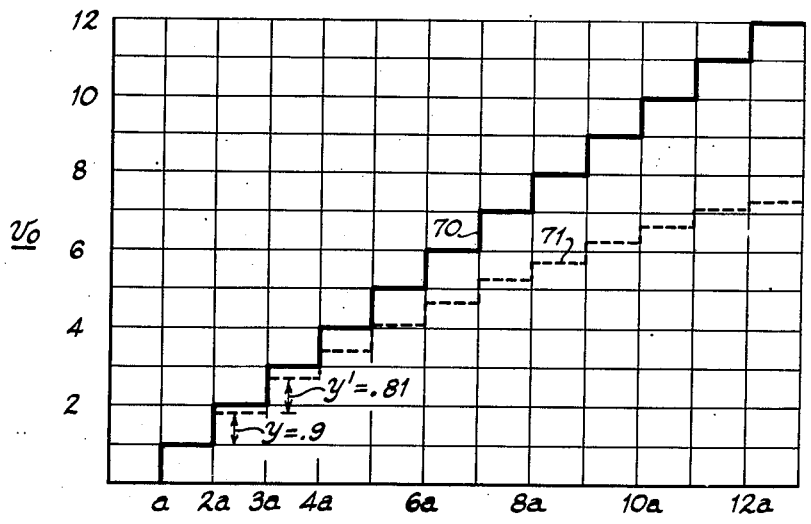
Fig. 3 is a graph illustrating operation of the system of Figs. 1 and 2.

A more general analysis of the above outlined method will now be presented to explain certain permissible and desirable modifications. Reference should now be had to Figs. 2 and 3 and the following mathematical analysis.

Consider the block diagram of Fig. 2 which operationally represents that portion of the system of Fig. 1 between the points at which the voltages $(v_{in})$ and $(v_o)$ appear. It will be assumed that the voltage effective at the input of the bridge 24 is equal to $(v_{in}+v_o)$. For convenience, the mixer bridge amplifier 24 of Fig. 1 will be given the same reference character in Fig. 2. Similarly, the feedback amplifier or second network is again identified by the reference character 50. The modulator 33, oscillator 35, the magnetic tape 36 with its associated recording and detecting heads 39 and 43, the discriminator 45, and the erasing circuit 61 will be considered as recorder 60 having the following specific mode of operation, i. e., if the input to the recorder 60 is $(v_{in})=f(t)$, then the output will be $(v_o)=f(t-a)$. That is, the output $(v_o)$ of the recorder is the same as the input $(v_{in})$ thereto except delayed by a time interval $(a)$, determined in the magnetic recorder by the travel time of a given segment of the recording tape between the recording and detecting heads.

There are several analytical methods that may be used to determine the character of the output of the system when a particular input voltage which is a function of time is assumed. A particular analytical method using the Laplace transform as an operator provides a more general solution and additionally makes available a usable expression for an impedance equivalent to, and describing the operation of, the mixer-recorder-feedback system. For the following analysis, Laplace transforms will be used, and, for the purpose of orientation, the voltages in the system of Fig. 2 are listed in the following table together with the corresponding or equivalent Laplace notation therefor.

| Conventional Notation | Laplace Notation | |
|---|---|---|
| $v_{in}=f(t)$ | $V_{in}=F(s)$ | (1) |
| $v_1=-1(v_{in}+v_2)=f'(t)$ | $V_1=-1(V_{in}+V_2)$ | (2) |
| $v_o=f'(t-a)$ | $V_o=V_1 A e^{-as}$ | (3) |
| $v_2=v_o(-B)$ | $V_2=V_o(-B)$ | (4) | where:

$s$ is a Laplace operator;
$e$ is the base of the natural logarithms;
A is the gain of the recorder 60; and
B is the gain of the feedback amplifier 50.

It will be assumed that the mixer 24 has an amplification equal to one (1) as respects both ($v_{in}$) and ($v_2$) and has a phase shift of 180 degrees, i. e., there is a phase reversal of input signals in the mixer 24 without amplification. Its transfer characteristic or function, the ratio of ($v_1$) to ($v_{in}+v_2$), may therefore be expressed as $T_{24}=-1$, A being unity. Additionally, from Equation 4 expressed in conventional notation, it will be seen that amplifier 50 has, in general, an amplification factor equal to (B) and has a phase characteristic equal to (−1). Its transfer characteristic then is $T_{50}=-B$.

In order to understand the operation of the system, it will be desirable to evaluate the transfer function ($T_s$) of the whole system in terms of the Laplace transform. Mathematically, the transfer function, $T_s$, may be expressed as:

$$\frac{V_o}{V_{in}}=T_s \qquad (5)$$

The transfer function ($T_s$) may then be evaluated in terms of the Laplace Equations 1–4 of the above table and in the following manner:

$$V_o=V_1 A e^{-as}; \text{ or } \frac{V_o}{Ae^{-as}}=V_1 \qquad (6)$$

The voltage ($V_1$) expressed in Equation 2 in terms of ($V_{in}$), ($V_2$) and of the transfer function of the mixer 24 is:

$$V_1=-1(V_{in}+V_2) \qquad (7)$$

Similarly, the feedback voltage ($V_2$) is expressed by Equation 4 in terms of the output voltage ($V_o$) and the transfer characteristic (−B) of the amplifier 50:

$$V_2=-BV_o \qquad (8)$$

By substituting Equation 8 into Equation 7 and the result into Equation 6 to eliminate the terms ($V_1$) and ($V_2$), the following relationship is obtained:

$$\frac{V_o}{Ae^{-as}}=-1(V_{in}-BV_o) \qquad (9)$$

or $$\frac{V_o}{Ae^{-as}}-BV_o=-V_{in} \qquad (10)$$

or $$\frac{V_o}{V_{in}}=\frac{-Ae^{-as}}{1-ABe^{-as}}=-T_s \qquad (11)$$

From Equation 11 it can be seen that the output voltage ($V_o$) may be expressed in terms of the input voltage ($V_{in}$) and the transfer function ($T_s$) of the whole system; i. e., $$V_o=-V_{in}T_s=-V_{in}\frac{Ae^{-as}}{1-ABe^{-as}} \qquad (12)$$

In terms of conventional notation, the output voltage ($v_o$) is equal to the inverse Laplace transform of the right-hand side of Equation 12; that is, $$V_o=L^{-1}-V_{in}\frac{Ae^{-as}}{1-ABe^{-as}} \qquad (13)$$

where $L^{-1}$ indicates that the inverse Laplace transform is to be taken.

In order to proceed beyond Equation 13 in the evaluation of the output voltage ($v_o$), the character of the input voltage ($v_{in}$) must be taken into account and its conventional notation converted to Laplace notation for operation in accordance with the right-hand side of Equation 13. In order to simplify the mathematical explanation of the operation of the system, it will now be assumed that a unit step-function input voltage is applied to the mixer 24. The unit step-function input voltage may be described mathematically as follows:

$$v_{in}=u(t)=\begin{cases} 0 & t<o \\ 1 & t>o \end{cases} \qquad (14)$$

In other words, ($v_{in}$) remains zero until a given instant, ($t=0$), and then immediately jumps to, and thereafter remains at, a value equal to one (1).

The Laplace transform of such a step function is:

$$V_{in}=\frac{E_{max}}{s}=\frac{1}{s} \qquad (15)$$

where $E_{max}$ has a numerical value of one (1). Substituting the foregoing into Equation 13, the following relationship is obtained:

$$v_o=L^{-1}-\left[\frac{E_{max}}{s}\frac{Ae^{-as}}{1-ABe^{-as}}\right]=L^{-1}-\left[\frac{1}{s}\frac{Ae^{-as}}{1-ABe^{-as}}\right] \qquad (16)$$

By dividing the denominator into the numerator, the right-hand side of Equation 16 becomes an infinite power series of the following form:

$$v_o=L^{-1}-A\left[\frac{e^{-as}}{s}+\frac{ABe^{-2as}}{s}+\frac{(AB)^2 e^{-3as}}{s}+\ldots\frac{(AB)^{(n-1)}e^{-nas}}{s}+\ldots\right] \qquad (17)$$

When Equation 16 is expressed as an infinite power series, Equation 17, the inverse Laplace transform of each of the terms may be taken and the voltage ($v_o$) may then be plotted as a function of time, ($v_o$) being equal to the sum of all of the terms of Equation 17 as indicated. From tables listing conventional functions and their equivalent Laplace transforms, it will be found that the inverse Laplace transform of the expression $$\frac{e^{-as}}{s}F(s)$$

is a specific function of ($t-a$), i. e., $$L^{-1}\frac{e^{-as}}{s}=u(t-a)$$

This relationship may be found in Transients in Linear Systems, vol. 1, by Gardner and Barnes, published by John Wiley and Sons, Inc., 1942, at page 352, Equation No. 6.01. The solution to Equation 17 is plotted in Fig. 3 with ($v_o$) as ordinates against time as abscissae. The ordinates ($V_o$) are expressed in units of ($V_{in}$) and the abscissae ($t$) are expressed in units of ($a$). The heavy line 70 represents a solution for the above-assumed conditions, namely, that ($v_{in}$) is zero until time (0) and is thereafter by a unit step function made equal to unity.

Each term of Equation 17 will itself be a unit step function since the product $AB=1$. The output ($v_o$) consists of the sum of the step functions, and they (the successive terms of Equation 17 become effective sequentially at $t=a$, $2a$, $3a$ * * * etc. Thus, unit increases ($V_{in}$) in the value of ($v_o$) occur for each successive time interval ($a$). More particularly, when:

$t$ is less than $a$, $v_o=0$;
after $t=a$, $v_o=1$;
after $t=2a$, $v_o=2$;
after $t=3a$, $v_o=3$;
after $t=na$, $v_o=n$.

It is to be noted that for this case where the product of AB is equal to 1, the voltage output ($v_o$) is increased in direct proportion to the number of times interval ($a$) is repeated with corresponding additions to the unit step functions ($V_{in}$) or is directly proportional to ($n$).

Now that the invention has been explained in connection with the example of the application of input signals ($V_{in}$) in terms of the simple unit step function, it is to be understood that the same principles of analysis are applicable for input signals of different type. More particularly, the input signals ($V_{in}$) which will be applied in connection with electrical exploration of the earth will be of complex character. Nevertheless, the system above described and analyzed will successfully function to increase the signal-to-noise ratio. It is sufficient here to say that with application of an input voltage ($V_{in}$) of repetitive character, such as a sinusoidal input voltage, adjustments are made so that there will be phase coicidence between the feedback voltage ($V_2$) and the input voltage ($V_{in}$). The sinusoidal voltage will be increased in magnitude to the same extent and effectively in the same manner as the step function voltage illustrated in Fig. 3. That is, every instantaneous value of the sinusoidal voltage is increased as respects the output voltage ($v_o$) in direct proportion to the number of cycles in which feedback of the sine wave voltage is effective.

It is to be noted, however, that for sine wave voltages not having the foregoing phase coincidence, and particularly sine wave voltages which might form a portion of the input voltage ($v_{in}$) that are irrational in frequency relation to the sine wave voltage having the foregoing phase coincidence, the increase in amplitude of such components will not be proportional to the number of feedback cycles.

Applying the foregoing analysis directly to the system of Fig. 1, it will be seen that the repeated or periodic signal component of the energy stored on the magnetic tape 36 may be increased in direct proportion to the number of cycles of operation of the feedback system subject only to the limitations imposed by the components of the system embodying the inventions. There is a limit to the amplitude of signals which the amplifiers 24 and 50 and the recorder 60 will be able to accommodate without distortion due to overdriving or saturation. Therefore, operation of the system should take place within the dynamic range of the amplifiers and of the recorder. In order to assure operation of the system below the upper limit of said dynamic range, the signal on the tape 36 is only permitted to build up to a value corresponding with or just below that upper limit, at which time input circuit, the feedback amplifier 50 and the erasing system 61 may be de-energized through operation of the counter mechanism 62, or otherwise effectively removed from the circuit. Thereafter the signals stored on tape 36 may be studied or recorded without distortion thereof.

The method and system of Fig. 1 may be modified as hereinafter described.

Referring again to Equation 17, it will be seen that for repeated cycles of operation of the feedback system, the increase in signal amplitude is a function of the product (AB). It will be remembered that (A) and (B) are the amplification factors of the recorder 60 and of the feedback amplifier 50, respectively (or the gain experienced by the signal in passing therethrough). If the product (AB) is less than 1, then for repeated cycles of operation, instead of the output voltage ($v_o$) increasing in unit steps, such as illustrated by the heavy line 70 of Fig. 3 for a unit step function input, the output ($v_o$) will increase in a different manner such as illustrated by the broken-line curve 71 of Fig. 3. During the time interval, ($a$) to ($2a$) part of curve 71 is the same as curve 70 and corresponds in value to the first term of Equation 17. During the interval from ($2a$) to ($3a$) the curve 71 indicates an increased amplitude, the increase being represented by the partial ordinate ($y$) which is equal to the value of the second term of Equation 17. Similarly, the partial ordinate ($y'$) is determined by the third term of Equation 17. If $A=1$ and $B=0.9$, then the amplitude of the output voltage ($v_o$) at a time $t=a$ is equal to 1 and when $t=2a$, ($v_o$) $=1.9$. Similarly, the output voltage at $t=3a$ would be equal to $(1.9+.81)$ or equal to 2.71. It will therefore be evident that the output voltage ($v_o$) will reach a maximum, approaching that maximum asymptotically at a rate dependent upon the product (AB). At infinity ($t=\infty$), the maximum would be equal to $$\frac{1}{1-AB}=\frac{1}{1-0.9}=10$$

It is therefore evident that the product (AB) may be so adjusted that the range of signal output will never exceed the dynamic range of the system, thus avoiding the need to utilize the counter device 62, or the switches 29a, 53a and 61a for the circuit-interrupting operations above described. However, the signal component 22 of the input voltage ($v_o$) at increased amplitude may be thereafter studied without interference by noise or distortion by circuit components of the system.

Overdriving of the system is prevented by the proper adjustment of the gain (B) of the feedback loop as by variation of the feedback resistor 54 of the bridge 50. Further, the tape or magnetic recording medium 36 need not be a loop but may be of the spooled variety used in some commercial magnetic recorders. Thus, either the complete closed loop or the spooled recording elements may be used in connection with the present invention. In the latter case the input signal is recorded and detected and after an interval of time determined by the gain of the system, the signal will reach a maximum. Thereafter, the period during which the signal may be studied on the oscilloscope 46 is limited only by the remaining playing time of a given spool of magnetic recording wire or tape. After it has been unwound in one direction, it may be rewound for further studies of the signal recorded thereon or the signals erased for the next exploratory operation. Other modifications within the scope of the invention will suggest themselves to those skilled in the art.

Since in electrical prospecting systems and methods it is often desirable to conduct investigations at several frequencies, the rate of actuation of the commutating device 13 is ordinarily adjustable so that it can be set at different values, as by varying the speed of operation of the driving motor. For the signal emphasizing action embodied in the present invention to take place at each of the frequencies selected for operation, it is necessary only that the distance between the point of recordation of the signal on the associated magnetic recording element and the point of detection therefrom always be an integral number of wave lengths of the desired signal. This may be accomplished by driving the wheel or pulley 37 directly from the motor 15 of variable speed, adjustable to satisfy the desired frequency requirements of the signal 16 applied to the earth. In such case, the rate of operation of the commutator 13 is directly proportional to the velocity of the tape or magnetic element 36. Thus, once the recording head 39 and detecting head are adjusted for the desired and above expressed relationship, they need not thereafter be changed. A change in frequency of the signal is automatically compensated for by a change in velocity of tape 36. However, in systems where it is desirable or necessary to operate the magnetic tape 36 at a constant speed, the distance between the recording and detecting heads 39 and 43 may be physically adjusted to compensate for changes in the frequency of the pulses 16. In that case a constant speed motor would be associated with pulley 37, and motor 15 of variable speed would drive the commutator 13.

Figure 4:
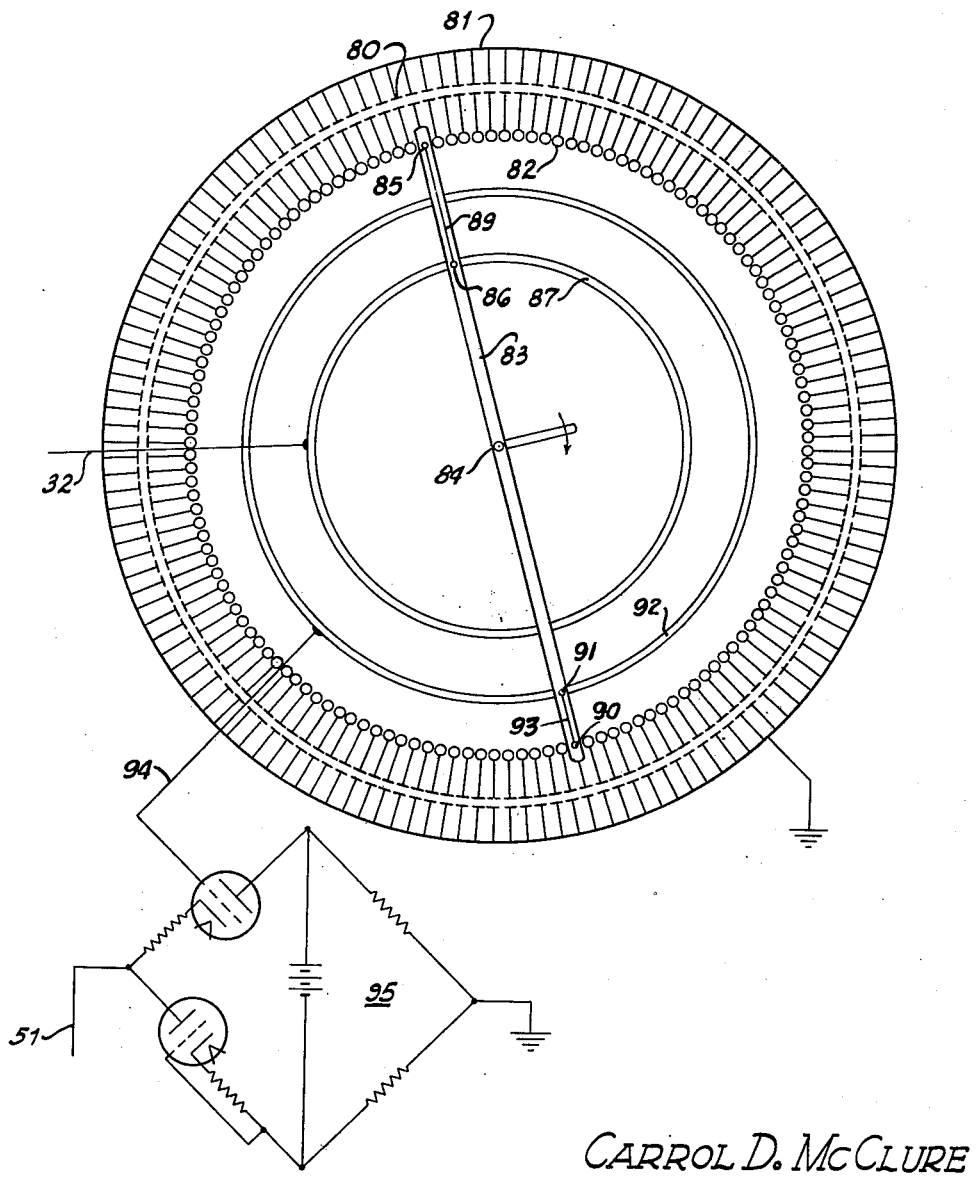
Fig. 4 is a modified storing system.

In Fig. 4 there is illustrated a modified form of recorder, without the additional components of the exploring system of Fig. 1, that will replace the magnetic recorder. More particularly, that portion of Fig. 1 connected between the conductor 32 of the bridge network 24 and the conductor 51 leading to the feedback bridge amplifier 50 may be removed and the condenser commutator system of Fig. 4 substituted therefor. In this system there is provided a plurality of condensers 80, each having one terminal connected to a common ground conductor 81. The other terminal of each of the condensers 80 is connected to one of a plurality of insulated commutator segments 82. A wiper arm 83 carried and driven at its center by a shaft 84 is associated with the system and carries at one end a first pair of brush contacts 85 and 86. The brush contact 85 is biased toward the segments 82 for electrical contact therewith and, similarly, the brush contact 86 is maintained in contact with a slip ring 87. Brushes 85 and 86 are electrically common, being interconnected by a conductor 89. The opposite end of arm 83 carries a pair of brush contacts 90 and 91. Brush 90 is maintained in contact with the commutator segments 82 and the brush 91 contacts a second slip ring 92. The contacts 90 and 91 are electrically common, being interconnected by a conductor 93. The arm 83 is rotated by a shaft 84 which may be driven by the motor 15 of Fig. 1 or by other means in synchronous rotation with the opening and closing of switch 13 of Fig. 1. The conducting ring 87 is connected by way of the conductor 32 to the output of the bridge 24 of Fig. 1. The conducting ring 92 is connected by way of conductor 94 to the input grid of a bridge 95 which is similar in construction and operation to the amplifier bridges 24 and 50 of Fig. 1. The bridge output of the bridge 95 is then connected to the conductor 51 which, in Fig. 1, leads to the amplifier bridge 50. The bridge amplifier 95 serves as a buffer stage between the commutator recorder and the bridge 50.

In operation the input voltage to the recorder is applied by way of conductor 32, slip ring 87, brush 86, conductor 89, and brush 85 to the segments 82 of the commutator device. As the wiper arm 83 is rotated by shaft 84 in synchronism with the input pulses 16 of Fig. 1, electric charges are stored on each of the condensers 80 that are proportional to the signal received by the detecting electrodes. The wiper arm 83 preferably is rotated one complete revolution in the time interval required for two complete cycles of the signal 16 of Fig. 1 so that variations in magnitude of the charges on condensers 82 correspond in form to two complete cycles of the input voltage to the mixer 24. Thus, two complete signal cycles together with random noise components will be stored on the condensers 80. The voltage on each condenser, at any instant during the first cycle that the input voltage is applied to the condenser commutator, will be equal to the final value of that voltage during the interval that the input brush 85 is in contact with the commutator segment 82 associated with the condenser since the resistance in series with the brushes is low to provide a low time constant circuit. Thus, for the first half of revolution of the arm 83 a complete cycle of the input voltage will be stored on half of the condensers associated with the condenser commutator. During the second half of the rotation of the arm 83 the wave form is again stored on the second half of the condensers and at the same time the one cycle of the signal stored during the first half revolution is detected or picked up by the brush 90 and applied to the input of the bridge 95 by way of conductor 93, brush 91 and slip ring 92.

It will be evident that the charges stored on the condensers 80 correspond in magnitude with variations in the signal output from the bridge 24. By continued rotation of the arm 83 while a signal is detected from the earth, the charge on the condensers 80 will be incrementally increased in proportion to the magnitude of the input signal and in proportion to the number of cycles of repeated storing due to the feedback of the detected signal by way of conductor 51, while the noise components will not suffer the same increase. The operation is described by the foregoing mathematical analysis just as was the operation of the magnetic recorder of Fig. 1. As was the case with the magnetic recording system, there will be a disproportionate increase in the amplitude of the cyclically repeated signal compared to the random noise components of the input voltage.

While particular embodiments of the invention have been described, it will be understood that further modifications will now suggest themselves to those skilled in the art. It is therefore intended to cover such modifications as fall within the scope of the appended claims.

What is claimed is:

1. A system for measuring the periodically recurring signal component of a voltage applied to the input terminals thereof which includes said signal component and noise energy of random polarity and amplitude which comprises a mixer circuit connected to said input terminals and responsive to said signal, a recording system connected to the output terminals of said mixer and receiving and storing energy corresponding in form with said input signals, means for detecting the stored signals, a feedback circuit connected between said detecting means and the input terminals of said mixer for adding the detected signals and said input signals with their periodically recurring signal components in phase-coincidence whereby said last named components are incrementally increased with respect to random noise energy.

2. A system for measuring the periodically recurring signal component of a voltage applied to the input terminals thereof which includes said signal component and noise energy of random polarity and amplitude comprising a mixer circuit connected to said input terminals and responsive to said signal, a magnetic recording system connected to the output terminals of said mixer for receiving and magnetically storing the output from said mixer in reproducible form corresponding with said input signals, means for detecting the stored signals, a feedback circuit connected between said detecting means and the input terminals of said mixer for adding the detected signals and said input signals with their periodically recurring signal components in phase-coincidence whereby said last named components are incrementally increased with respect to random noise energy.

3. A system for measuring the periodically recurring signal component of a voltage applied to the input terminals thereof which includes said signal component and noise energy of random polarity and amplitude comprising a bridge network having in one arm thereof an impedance connected in circuit with said input terminals dynamically controlled by said voltage applied thereto, a magnetic recording system connected to the output diagonal of said bridge network and responsive to output signals therefrom, said magnetic recording system having a traveling magnetic storage element driven at constant velocity for receiving said signals in form corresponding with said voltage, a detecting head adjacent said magnetic storage element later in the travel path than the point of storage and spaced therefrom from an integral number of wave lengths of said periodically recurring signal component of said output signals, a feedback path connected between said detector and said input terminals for adding said detected signals to said voltage whereby the ratio of the amplitude of said periodically recurring signal component to the amplitude of said random noise components is incrementally increased.

4. In an electrical system in which there appears a voltage comprised of repeatedly occurring signals which are to be measured and relatively high amplitude random noise, the combination comprising a magnetic storing medium, means for recording said repeatedly occurring signals on said medium in reproducible form, means for detecting said stored signals in synchronism with succeeding cycles of said signals, means for combining said detected signals and said repeatedly occurring signals successively to increase the amplitude of said stored energy in direct proportion to the number of storing operations and to substantially cancel said random noise, and means for measuring the amplitude of said stored energy after a predetermined number of storing operations.

5. Means for measuring a constant frequency alternating current signal in the presence of high amplitude random noise energy comprising an energy storing medium, means for continuously storing energy on said medium proportional to the sum of said noise energy and said signal, detecting means for generating a signal proportional to the energy stored on said medium, and means for adding the detected signal to said sum with the constant frequency alternating current component of said sum and of said detected signal in phase-coincidence whereby the ratio of amplitude of signal energy to noise is incrementally increased in direct proportion to the number of storing operations.

6. In a system for measuring a constant frequency alternating current signal in the presence of high amplitude random noise energy having a constant velocity traveling magnetic medium, the combination which comprises means for storing the sum of said signal and said random noise on said traveling medium, a detecting head spaced from the storing point a distance proportional to the velocity of said tape and inversely proportional to said constant frequency for detecting the signals stored thereon, and means for adding said detected signal to said sum at the storing point with the constant frequency components thereof in phase whereby the ratio of amplitudes of said constant frequency alternating current signal to said random noise is increased in proportion to the number of storing operations.

7. In an electrical prospecting system where equally spaced pulses are applied to the earth's surface and constant frequency electrical signals resulting therefrom are to be measured in the presence of high amplitude random noise signals combined therewith, the combination which comprises a magnetic storing medium driven at constant speed, amplifying means for applying said combined signal to said magnetic storing medium, means for detecting said signal at a point an integral number of wave lengths of said constant frequency signal from the point of storage thereof on said storing medium, circuit means connected to said detecting means for adding each cycle of said detected signal and of said combined signals in the storing circuit for repeatedly and selectively reinforcing signals of said constant frequency with respect to said high amplitude random noise energy.

8. A system for selectively treating a voltage having a periodic component and noise energy of random polarity and amplitude applied to the input terminals comprising means for continuously recording a signal proportional to said voltage and having an amplification factor A, means for detecting said recorded signal at a time $(a)$ after recordation thereof, a feedback network connected between said detecting means and said input terminals having amplification factor B, said system having an overall transfer function expressed by a Laplace transform function equal to $$\frac{Ae^{-as}}{1-ABe^{-as}}$$

where the product of AB is not greater than one (1) and $e$ is the base of the natural logarithms, and $s$ is a Laplace operator.

9. The system set forth in claim 8 in which the product of AB is less than one (1).

10. The combination set forth in claim 8 wherein the limit of a converging power series of the product of AB lies within the dynamic range of said system.

11. A system for measuring the periodically recurring signal component of a voltage applied to the input terminals thereof which includes said signal component and noise energy of random polarity and amplitude comprising a mixer circuit connected to said input terminals and responsive to said signal, an electrostatic recording system connected to the output terminals of said mixer for receiving and storing successively a plurality of electric charges which vary in magnitude and form corresponding with said input signals, means for successively detecting a voltage proportional to the magnitude of said stored charges, a feedback circuit connected between the detecting means and the input terminals of said mixer for adding the detected voltage and said input signals with their periodically recurring signal components in phase-coincidence whereby said last named components are incrementally increased with respect to said random noise energy.

12. A system for measuring the periodically recurring signal component of a voltage applied to the input terminals thereof which includes said signal component and noise energy of random polarity and amplitude comprising a mixer circuit connected to said input terminals and responsive to said signal, a multi-segment commutator having associated therewith a pair of diametrically opposed contact making brushes, a plurality of condensers, one connected to each of the segments of said commutator, means for rotating said brushes in synchronism with said periodic signal component, a circuit connection between one of said brushes and the output of said mixer circuit for successively storing on each of said condensers an electric charge proportional to an instantaneous value of the output from said mixer, a feedback circuit, a circuit connected between the output of said feedback circuit and the input of said mixer, and a circuit connection between the second of said brushes and the input of said feedback circuit for detecting from said condensers and applying to said feedback circuit a voltage proportional to said electric charges to add at the input terminals of said mixer the detected voltage and said input signals with their periodically recurring signal components in phase-coincidence whereby said last named components are incrementally increased with respect to random noise energy.

13. A system for measuring the periodically recurring signal component of a voltage which includes said signal component and noise energy of random polarity and amplitude, which comprises means for storing in reproducible form said voltage for a plurality of cycles of said periodically recurring signal component, means for detecting said stored signal, and means for adding the detected signal to a subsequent cycle of said periodically recurring signal component in phase-coincidence therewith for incrementally increasing the amplitude of said component relative to said random noise energy.

14. A system for measuring the periodic signal component of a composite signal which has said periodic signal component repeatedly recurring in time combined with obscuring random noise energy, which comprises means for storing in reproducible form an amplitude-time function corresponding with said composite signal, means for detecting a signal corresponding with said stored energy, means for adding the detected signal to said composite signal later in time with said constant frequency components thereof in phase-coincidence with the ratio of the former to the latter equal to or less than one, and means for repeatedly storing the sum of said signals for increasing the amplitude of said constant frequency components relative to the noise in said composite signal in proportion to the number of the repeated storing operations.

References Cited in the file of this patent

UNITED STATES PATENTS

| Number | Name | Date |
|---|---|---|
| 2,430,038 | Wertz | Nov. 4, 1947 |
| 2,436,503 | Cleveland | Feb. 24, 1948 |
| 2,439,446 | Begun | Apr. 13, 1948 |
| 2,508,408 | Liebson | May 23, 1950 |
| 2,521,635 | Kornei | Sept. 5, 1950 |
| 2,620,890 | Lee et al. | Dec. 9, 1952 |